United States Patent [19]

Ohhama

[11] Patent Number: 4,933,608
[45] Date of Patent: Jun. 12, 1990

[54] METHOD OF ELECTRICALLY BRAKING A LINEAR MOTOR

[75] Inventor: Shigeya Ohhama, Amagasaki, Japan

[73] Assignee: Mitsubishi Denki Kabushiki Kaisha, Japan

[21] Appl. No.: 343,670

[22] Filed: Apr. 27, 1989

[30] Foreign Application Priority Data

Jun. 6, 1988 [JP] Japan .................... 63-137280

[51] Int. Cl.$^5$ ............................... H02P 5/34
[52] U.S. Cl. ...................... 318/135; 318/798; 318/801; 318/803; 318/807
[58] Field of Search ............. 318/38, 135, 467, 687, 318/703, 713, 741–744, 757–764, 800–812, 799, 139

[56] References Cited

U.S. PATENT DOCUMENTS

| | | | |
|---|---|---|---|
| 3,671,832 | 6/1972 | Salihi | 318/800 |
| 3,899,725 | 8/1975 | Plunkett | 318/802 |
| 4,042,863 | 8/1977 | Franklin | 318/800 |
| 4,280,085 | 7/1981 | Cutler et al. | 318/803 |
| 4,281,276 | 7/1981 | Cutler et al. | 318/810 |
| 4,287,463 | 9/1981 | Walker et al. | 318/803 |
| 4,311,951 | 1/1982 | Walker et al. | 318/803 X |
| 4,315,203 | 2/1982 | Ibamoto et al. | 318/801 X |
| 4,405,886 | 9/1983 | Williamson | 318/757 X |
| 4,509,004 | 4/1985 | Shepard | 318/801 |
| 4,818,927 | 4/1989 | Hino et al. | 318/798 |

OTHER PUBLICATIONS

A. K. Wallace et al., "Slip Control For LIM Propelled Transit Vehicles", Sep. 1980, vol. MAG-16, No. 5.

*Primary Examiner*—William M. Shoop, Jr.
*Assistant Examiner*—Paul Ip
*Attorney, Agent, or Firm*—Leydig, Voit & Mayer

[57] ABSTRACT

In a method of controlling an electric brake for a linear motor, the slip frequency of the linear motor is decreased as the speed of the linear motor decreases and, when the speed of the linear motor reaches 0km/h, the slip frequency is set to approximately 0Hz.

15 Claims, 4 Drawing Sheets

METHOD OF ELECTRICALLY BRAKING A LINEAR MOTOR

BACKGROUND OF THE INVENTION

1. Field of the Invention

The present invention relates to a method of controlling an electric braking operation of a linear motor which is controlled by a variable voltage variable frequency (VVVF) inverter and, more particularly, to a control method which, through simple control, enables electric braking operation to be effectively utilized to bring the linear motor substantially to a stop.

2. Description of the Related Art

FIG. 1 is a characteristic chart of electric braking operation of a rotary type induction motor, which is described in, for example, "RAILWAY ELECTRIC ROLLING STOCKS" (*Denkisha no Kagaku*), vol. 39, No. 6, 1988, page 30. In the figure, symbol BE denotes an electric braking force, and symbol I denotes a motor current. During the stopping period of the induction motor, after the speed V of a vehicle decreases to $V_1$ (for example, approximately 10 km/h), the electric braking force BE is decreased by decreasing the motor current I. When the speed V reaches a speed $V_3$ immediately before the stoppage of the induction motor (for example, 3-5 km/h), then the electric braking force BE is set to zero. In the speed region less than the speed $V_1$, the stopping of the vehicle is controlled by increasing an air braking force so as to obtain a constant overall braking force including the electric braking force BE and the air braking force.

FIG. 2 is a characteristic chart showing a conventional method of controlling electric a linear motor, which is disclosed in Japanese Patent Laid-open No. 59136087. As can be seen from the figure, a slip frequency fs is kept at a constant value $fs_0$ in a variable voltage variable frequency (VVVF) region in which the speed V of the linear motor ranges from $V_4$ to $V_2$ and, in a constant voltage variable frequency (CVVF) region greater than $V_2$, the slip frequency fs increases in accordance with an increase in the speed V.

In general, during the operation of the electric braking operation, the following relationship is established $$fm = fi + fs \tag{1}$$

where fm is the speed frequency obtained by converting the speed V into a frequency and fi is the inverter output frequency. The electric braking force BE depends upon the inverter output frequency fi and, when the inverter output frequency fi reaches 0 Hz, the electric braking force BE loses its effect. Accordingly, where, as in the case of the conventional example of FIG. 2, the electric braking force is applied while controlling the slip frequency fs to be the constant value $fs_0$ in the VVVF region, when the speed frequency fm becomes equal to the slip frequency $fs_0$, the inverter output frequency fi becomes 0 Hz in accordance with the equation (1) and the electric braking force BE loses its effect. However, at this point in time, since the speed frequency fm is not 0 Hz, it follows that the linear motor has a speed $V_4$ which is represented by $$V_4 = fm \cdot K = fs_0 \cdot K$$

where K is a constant which is used to convert the frequency into a speed.

In the region of less than the speed $V_4$, the stopping of the vehicle is controlled by means of a brake, such as an air brake, which utilizes friction. In general, however, since the slip frequency fs of the linear motor is large relative to the inverter output frequency fi, the speed $V_4$ at which the electric braking force BE loses its effect is, for example, 10-15 km/h which is high compared to the speed $V_3$ (3-5 km/h) of the general rotary type induction motor described above.

In practice, the electric braking force BE is intentionally decreased and the air brake is started to act at a speed higher than the speed $V_4$ (for example, 20-25 km/h) so as to gradually shift the stopping control by means of the electric braking force BE to one by means of the air braking force. Accordingly, use of the air brake utilizing friction must be initiated at fairly high speeds, thus resulting in the problem that skidding easily occurs. If skidding occurs and the contact surfaces of wheels become flat, noise between wheels and rails may occur and the vehicle becomes uncomfortable to ride in. In addition, the labor required for maintenance, such as grinding of the contact surfaces of the wheels, may increase.

In order to prevent the above-described skidding, a method is proposed which comprises the steps of activating a reverse-phase braking operation to slow down the linear motor in the speed region not greater than the speed $V_4$ at which the electric braking force BE loses its effect, and then using the air brake after the linear motor has slowed down. In the reverse-phase braking operation, when the inverter output frequency fi reaches 0 Hz, the phase sequence of the inverter output is reversed to apply a braking force which acts in the direction opposite to the preceding direction of vehicle travel. Accordingly, if the reverse-phase braking operation is to be used, in order to prevent the vehicle from travelling backwardly, it is necessary to detect the fact that the speed V of the linear motor has reached 0 km/h and then stop the linear motor. As described above, in case that the reverse-phase braking operation is to be used, it is required to use a complicated control for realizing the change of the phase sequence of the inverter output, the detection of zero speed, or the like.

SUMMARY OF THE INVENTION

It is, therefore, an object of the present invention to provide a method of controlling electric braking operation a linear motor, which is capable of preventing skidding from occurring even during the use of an air brake and which, through simple, enables the electric braking operation to be effectively utilized until the linear motor substantially stops.

To achieve the above object, in accordance with the present invention, there is provided a method of controlling electric braking operation of a linear motor, which comprises the steps of decreasing a slip frequency of linear motor as the speed of the linear motor decreases and setting the slip frequency to approximately 0 Hz when the speed of the linear motor reaches 0 km/h.

The above and other objects, features and advantages of the present invention will become apparent from the following description of the preferred embodiments, taken in conjunction with the accompanying drawings.

DESCRIPTION OF THE PREFERRED EMBODIMENTS

Embodiments of the present invention will be described below with reference to the accompanying drawings.

Figure 1:
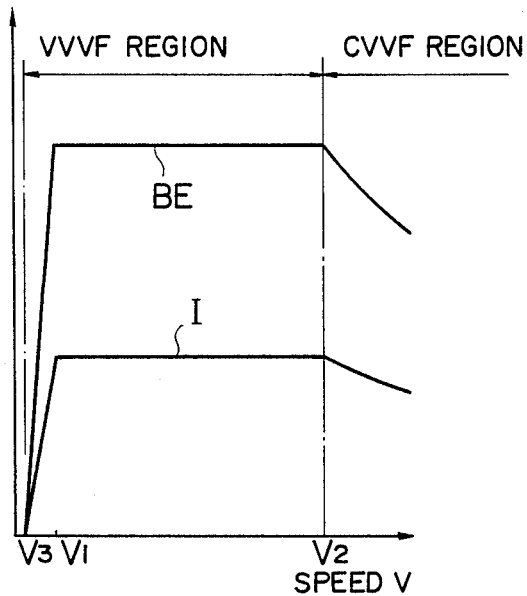
FIG. 1 is a characteristic chart of an electric braking operation of a conventional rotary type induction motor.
Figure 2:
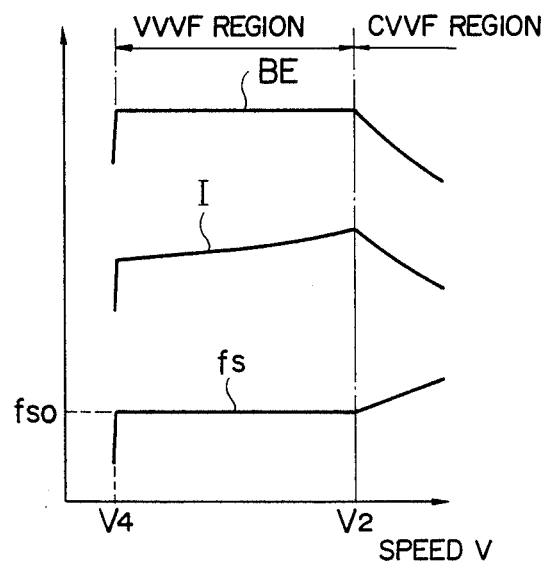
FIG. 2 is a characteristic chart showing a conventional method of controlling electric braking operation of a linear motor.
Figure 3:
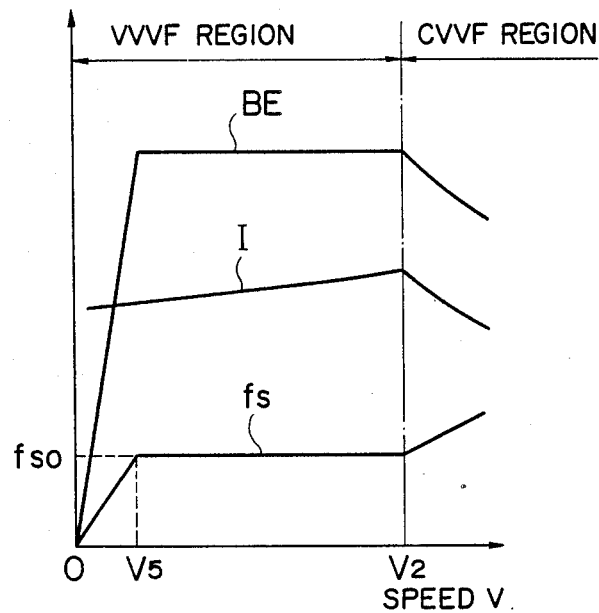
FIG. 3 is a characteristic chart showing a slip frequency, an electric braking force and a motor current, in a method of controlling electric braking operation of a linear motor in accordance with an embodiment of the present invention.

A VVVF inverter (not shown) is connected to a linear motor (not shown), and the linear motor is driven under the control of the inverter. In FIG. 3, symbol BE denotes electric braking force, symbol I motor current, and symbol fs slip frequency of the linear motor. It is assumed that the inverter provides VVVF control when the speed V of the linear motor is not greater than $V_2$ and CVVF control when the speed V is equal to or greater than $V_2$.

As can be seen from FIG. 3, the slip frequency fs of the linear motor in the CVVF region increases in accordance with an increase in the speed V thereof. More specifically, the slip frequency fs is represented by $fs=AV+B$, where A and B are constants. On the the other hand, in the VVVF region, the slip frequency fs is kept at a constant value $fs_0$ when the speed V of the linear motor is in a range of from $V_2$ to $V_5$. In the speed region of less than $V_5$, the slip frequency fs is proportional to the speed V of the linear motor. When the speed V of the linear motor reaches 0 km/h, the slip frequency fs becomes 0 Hz. Accordingly, the slip frequency fs is represented by $fs=(fs_0/V_5)\cdot V$ in this motor speed range. Incidentally, the speed $V_5$ is set at 10 km/h or less.

Figure 4:
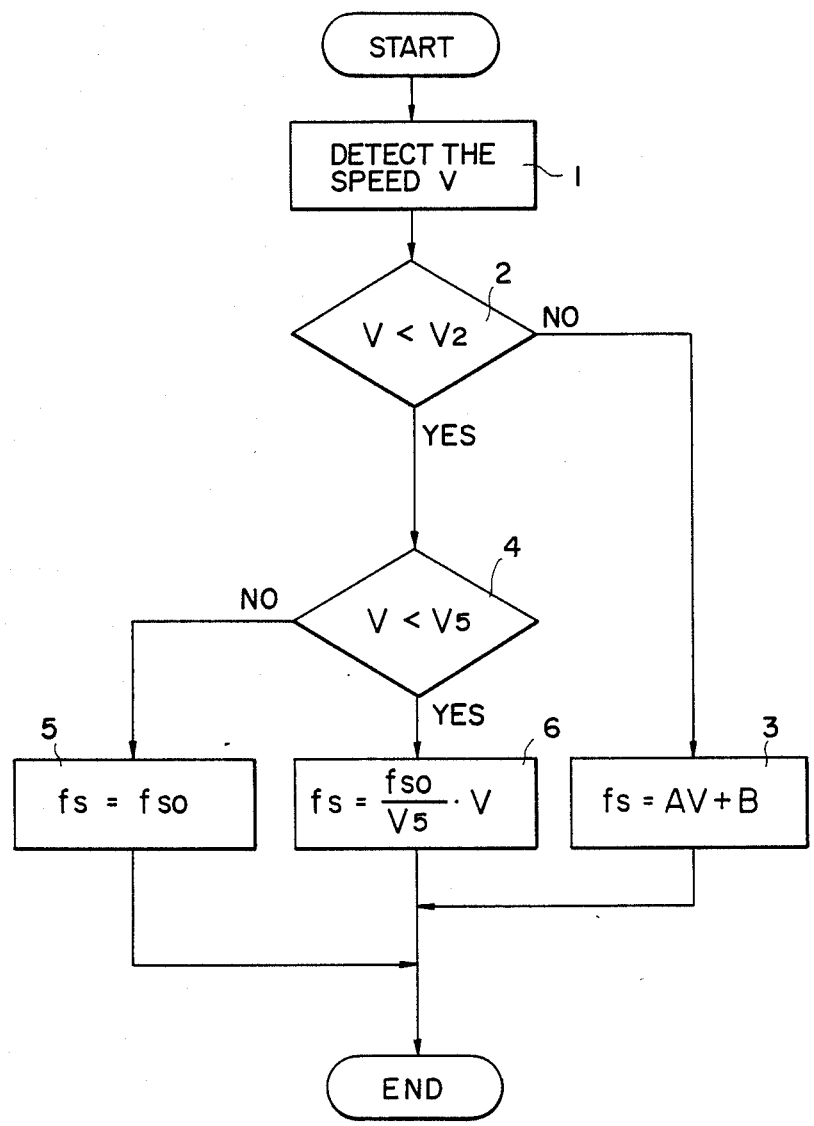
FIG. 4 is a flow chart showing the stopping operation of a linear motor in the embodiment of FIG. 3.

The stopping operation of the linear motor will be described below with reference to FIG. 4. It is assumed that the speed V of the linear motor is decreased to stop the linear motor by decreasing inverter output frequency fi supplied from the inverter to the linear motor. First, the speed V of the linear motor is detected in Step 1 and is then compared with the speed $V_2$ in Step 2. When the detected speed V is not less than $V_2$, the slip frequency fs is controlled so as to have the value of $(AV+B)$ in Step 3. On the other hand, when the detected speed V is less than $V_2$, the speed V is further compared with the speed $V_5$ in Step 4. When the speed V is not less than $V_5$, the slip frequency fs is kept at the constant value $fs_0$ in Step 5.

Meanwhile, when the speed V of the linear motor becomes less than the speed $V_5$, the slip frequency fs is controlled to have the value of $(fs_0/V_5)\cdot V$ in Step 6. Accordingly, the slip frequency fs, as shown in FIG. 3, starts to decrease in proportion to the speed V of the linear motor together with the electric braking force BE. At this time, the operation of an air brake is started so that the overall braking force is kept constant at any time during the braking operation.

Thereafter, when the inverter output frequency fi is further decreased to decrease the speed V of the linear motor, the slip frequency fs also decreases. At the time when the inverter output frequency fi reaches 0 Hz, the slip frequency fs becomes 0 Hz and the speed frequency fm also becomes 0 Hz on the basis of the above-described equation (1), that is to say, the speed V of the linear motor becomes 0 km/h. Accordingly, it is possible to exert the electric braking force BE in relation to the inverter output frequency fi until the linear motor stops. In consequence, it is not necessary to use the air brake while the speed V of the linear motor is in a range of high speeds and, therefore, the occurrence of skidding is prevented.

Figure 5:
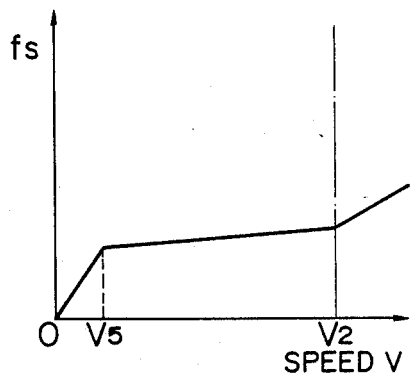
FIG. 5 is a characteristic chart of slip frequency according to another embodiment of the present invention.

In the above-described embodiment, when the speed V of the linear motor is in the range $V_2$–$V_5$, the slip frequency fs is fixed to the constant value $fs_0$, but this value is not construed as a limitative one. As shown in FIG. 5 by way of example, the slip frequency fs may be controlled so that it may decrease in a predetermined ratio with respect to a decrease in the speed V of the linear motor.

Figure 6:
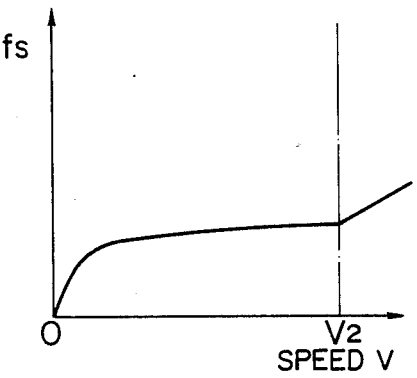
FIG. 6 is a characteristic chart of slip frequency according to still another embodiment of the present invention.

In addition, as shown in FIG. 6, the slip frequency fs may be varied so that it describes a parabola over the VVVF region of the inverter, that is, over the range in which the speed V of the linear motor is 0 to $V_2$, on the condition that the slip frequency fs decreases as the speed V of the linear motor decreases from $V_2$ and that when the speed V reaches 0 km/h, the slip frequency fs becomes 0 Hz.

Figure 7:
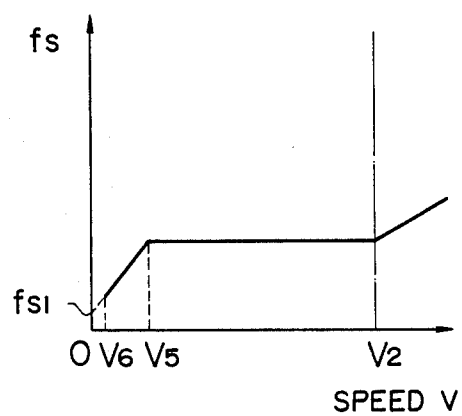
FIG. 7 is a characteristic chart of slip frequency according to yet another embodiment of the present invention.

In addition, the slip frequency fs may be controlled so that, when the speed V of the linear motor reaches 0 km/h, the slip frequency fs becomes not 0 Hz frequency $fs_1$ which is slightly higher than 0 Hz as shown in FIG. 7, whereby, when the inverter output frequency fi is 0 Hz, the linear motor still has a low speed $V_6$, for example, approximately 2-3 km/h. In this case, the electric braking force BE loses its effect when the speed V of the linear motor reaches $V_6$. However, since the value of the speed $V_6$ is very small, there is no possibility that the problem of skidding occurs even if braking control is effected by means of the air brake alone after the speed V of the linear motor reaches $V_6$.

What is claimed is:

1. A method of controlling a linear motor to bring said motor substantially to a stop by electric braking operation, said linear motor being controlled by an inverter having a variable output frequency which is supplied from said inverter to said linear motor, said linear motor having a speed frequency and a slip frequency, during electric braking operation which is the difference between the speed frequency and the output frequency of said inverter, said method comprising the steps of:

controlling said inverter to reduce speed of said linear motor to a predetermined speed which is above 0 km/h;

when the speed of said linear motor reaches the predetermined speed, decreasing the output frequency of said inverter so that the slip frequency of said linear motor decreases with respect to the speed of said linear motor and the slip frequency becomes approximately 0 Hz when the speed of said linear motor reaches a low speed less than approximately 2-3 km/h, thereby exerting an electric braking force to bring said linear motor substantially to a stop.

2. A method according to claim 1, wherein said inverter is a variable voltage variable frequency (VVVF) inverter.

3. A method according to claim 2, wherein the predetermined speed is in a variable voltage variable frequency region of said inverter.

4. A method according to claim 3 wherein the slip frequency becomes substantially 0 Hz when the speed of said linear motor reaches substantially 0 km/h.

5. A method according to claim 4 wherein when the speed of said linear motor is between 0 km/h and the predetermined speed, the slip frequency changes with respect to the speed at a constant rate, said slip frequency being kept constant and when the speed of said linear motor is between the predetermined speed and a higher speed which is an upper limit of the variable voltage variable frequency region of said inverter, the slip frequency is constant.

6. A method according to claim 5, wherein the predetermined speed is not greater than 10 km/h.

7. A method according to claim 4, wherein when the speed of said linear motor is between 0 km/h and the predetermined speed, the slip frequency changes with respect to the speed of said linear motor at a first rate, and when the speed of said linear motor is between the predetermined speed and a second speed which is higher than the predetermined speed and which is the upper limit of the variable voltage variable frequency region of said inverter, the slip frequency changes at a second rate which is smaller than the first rate.

8. A method according to claim 7, wherein the predetermined speed is not greater than 10 km/h.

9. A method according to claim 4, wherein the slip frequency changes describe a curve with respect to the speed of said linear motor.

10. A method according to claim 9, wherein said curve is a parabola.

11. A method according to claim 3, wherein, when the speed of said linear motor is 0 km/h, the slip frequency has a predetermined value which is above 0 Hz.

12. A method according to claim 7 wherein the slip frequency changes at the first and second rates describe a parabola with respect to the speed of said linear motor.

13. A method according to claim 7 wherein the first and second rates are both constant.

14. A method according to claim 4 wherein the first and second rates are both changing.

15. A method according to claim 3 wherein the slip frequency is greater than 0 Hz when the speed of said linear motor is 0 km/h.

* * * * *